Figure 1:
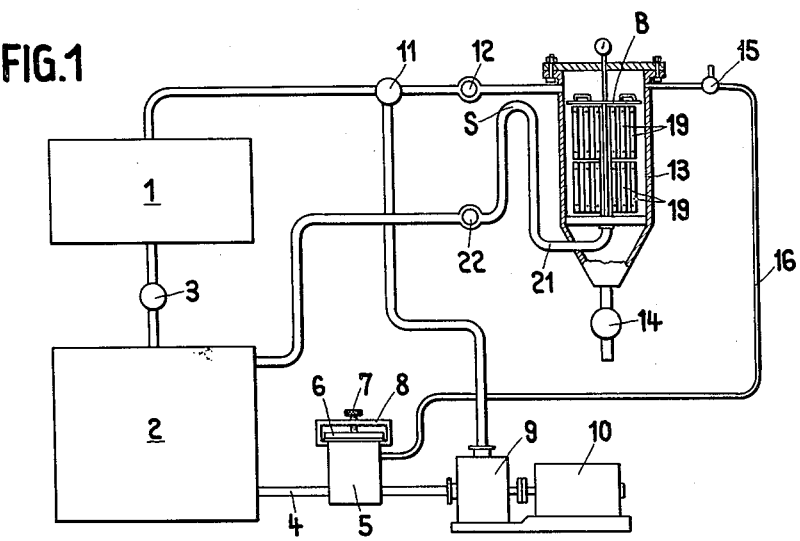

Aug. 21, 1962 F. A. BEUTLER 3,050,192
FILTER
Filed April 13, 1959 3 Sheets-Sheet 1

INVENTOR
Friedrich August Beutler
BY
ATTORNEY

Aug. 21, 1962 F. A. BEUTLER 3,050,192
FILTER
Filed April 13, 1959 3 Sheets-Sheet 2
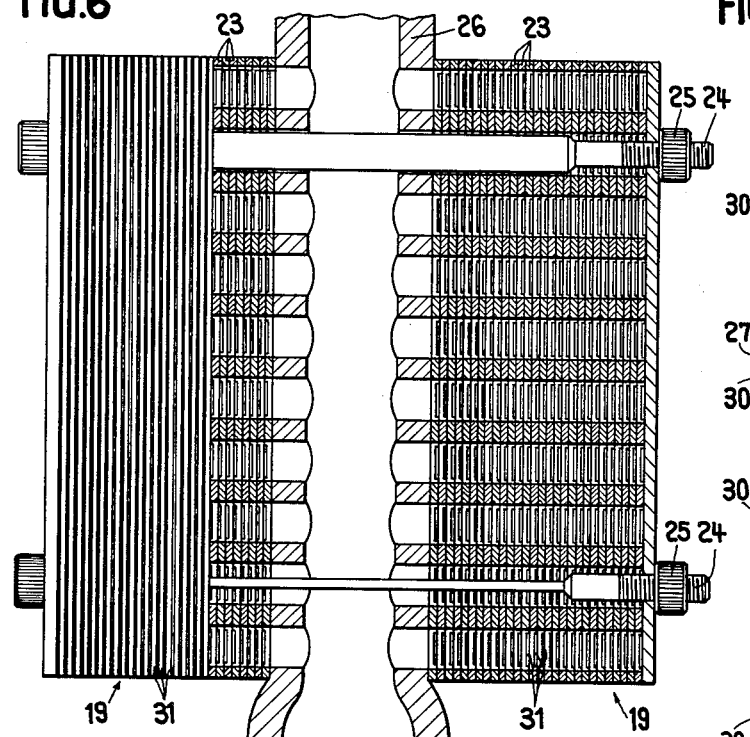
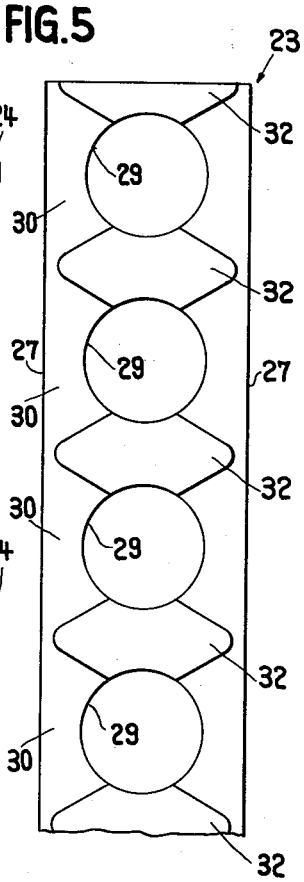
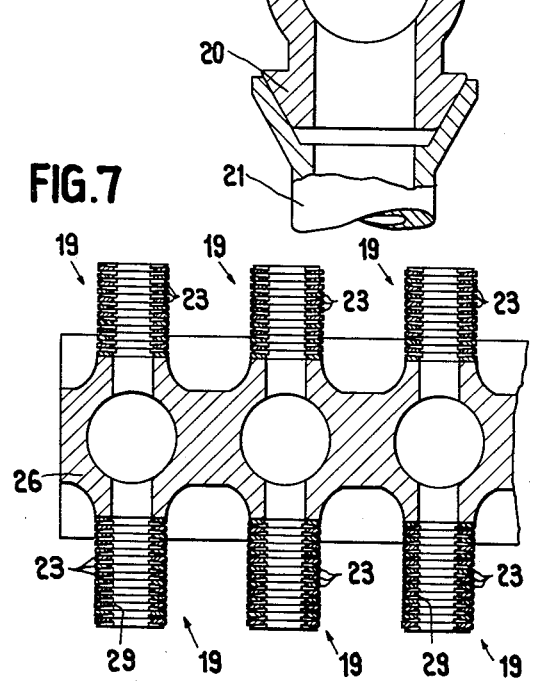
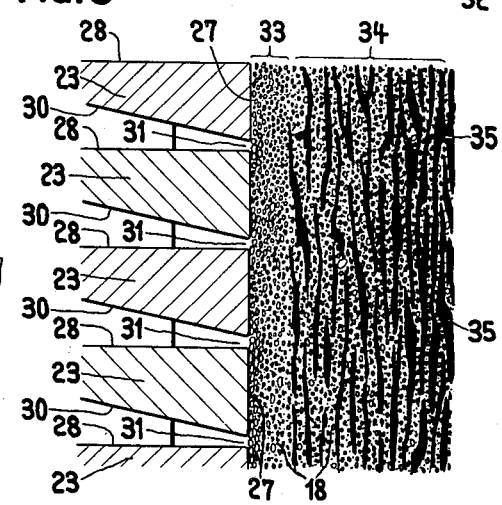
INVENTOR
Friedrich August Beutler
BY
Edward V. Connor
ATTORNEY metallic carrier carrier of insulating material INVENTOR
Friedrich August Beutler

United States Patent Office 3,050,192
Patented Aug. 21, 1962

3,050,192
FILTER
Friedrich August Beutler, Burglenstrasse 52,
Berne, Switzerland
Filed Apr. 13, 1959, Ser. No. 805,870
Claims priority, application Switzerland Nov. 4, 1953
2 Claims. (Cl. 210—488)

This application is a continuation-in-part of Serial No. 463,282, filed October 19, 1954, now abandoned.

This invention relates to a filter and more particularly to a filter in which a filter cake of a powdery auxiliary filtering material is deposited on the filtering surfaces and in which the deposited filtering material automatically drops off filtering bodies having at least approximately vertical filtering surfaces, whenever the filtering plant is shut down.

Filters of that kind are known and are for instance used in dry cleaning plants where the cleaning solvent is pumped through the goods to be cleaned and afterwards through a filter in which the unsolved contaminations are deposited. In cleaning plants of that kind a filtering material, for instance kieselguhr powder or the like is added to the solvent and is deposited on the filtering surfaces in order to produce a filter cake at the beginning of every charge of goods to be cleaned. Immediately after the cleaning process of each charge the filter cake shall fall off automatically in order that a new cake may be formed at the beginning of the next treating period.

In a known filter of this kind as disclosed in the British patent No. 707,275 the approximately vertical filtering surfaces of the filtering bodies are made of wires arranged side by side and of which at least the one of every two adjacent wires is slightly corrugated in such a way that slits of varying width for the passage of the filtrate are formed between adjacent wires. The main difficulty in the manufacture of such wire filters consists in so assembling and supporting the wires in the filtering surface that the filtering faces and individual wires cannot be deformed by the filter pressure so that the shape of the slits will change to such an extent that formation of a continuous filtering cake is rendered impossible. In order to avoid excessive deformation relatively thick and stable wires are to be used compared with the width of the slits formed between such wires so that the total slit or passage surface is very small as compared with the total filter surface. This unfavorable relation of the total filter opening to the total filtering surface is still rendered more unfavorable by the fact that the wire surfaces are to be supported from inside the filtering body and the wires are to be connected together by means of welding seams whereby no flow of filtrate will take place where the wires are supported from inside and where they are connected together by means of welding seams. The manufacture of high quality wire filters has proved to be very difficult and in spite of utmost care a high scrap-to-finish product ratio is to be expected so that the producing costs of such wire filters are high.

It is the main object of this invention to overcome these disadvantages of known filters by making the filtering body of flat elements piled onto each other, the longitudinal axis of such elements being at least approximately vertical in working position and at least one of each two elements being shaped in such a way that canals for the passage of the filtrate are formed between adjacent elements.

While in the known wire filters the slits are relatively short and of varying width, very narrow corners being formed at the ends of the slits and such corners being gradually clogged by fine particles of the filtering material and will no longer clean automatically. Therefore the total effective slit opening of the filter gradually decreases, that is, the self-cleaning effect of the filter is not an absolute one.

It is a further object of this invention to overcome this disadvantage by providing slit-like flow passages for the filtered fluid between adjacent flat filter elements, the width of such slit-like passages being uniform over the full height of the filtering body. It is impossible that such flow passages of uniform width are clogged by fine particles of contaminations or of the auxiliary filtering material and therefore my filter is the first having a self-cleaning effect in the absolute and correct sense of the term.

It was believed that the resilience of the well-known wire filtering-mass carriers would be a requirement for self-cleaning, because the slightly deformed wire surfaces would return to their original position when the filter pressure ceases to act thereon, the filtering material being thrown off its carrier by this return motion of the wires.

It is another object of this invention to provide an absolutely rigid and pressure resistant filter which is still self-cleaning due to the above features and due to other features which will be apparent from the following description.

It is one of the main objects of this invention to improve the self-cleaning properties of the filtering-mass carrier by proper choice of the material thereof. It was found that the self-cleaning properties are substantially improved by using flat elements of electrically insulating material such as plastic materials together with a loose powdery auxiliary filtering material of electrically insulating particles such as kieselguhr powder or the materials well known under the trade name "Hyflo" manufactured by Johns-Manville Corporation, New York. It was found that the auxiliary filtering material is repelled from the carrying surfaces by similar electrostatic charges of the carrier and of the auxiliary filtering material, this effect promoting self-cleaning of the filter. It is true that filters made of electrically insulating material are known per se but such filters have never had self-cleaning properties and were never used with an auxiliary filtering material and therefore such filters could not possibly suggest the particular advantages of electrically insulating materials for improving the self-cleaning properties of a filter.

It is a further object of this invention to substantially improve the specific flow capacity per unit area of the filtering-mass carrier first by improving the flow-passage to total-surface ratio of the carrier and further by increasing the operating pressure to the maximum allowable by the auxiliary filtering material, no strict pressure limit being prescribed by the filter carrier itself. With the well known wire filters as disclosed in the British Patent 707,275 the filtering pressures were limited to 1.8 kg./cm.$^2$. However, higher pressures would be allowable and I operate my self-cleaning filter at pressures up to 3 to 3.5 kg./cm.$^2$. Further by the general construction of my filtering mass carrier set out above the effective flow passage may be improved by a factor of 3 over the flow passage of the self-cleaning wire filter disclosed in the British Patent 707,275. Due to the increased flow area the weight of auxiliary filtering material deposited per unit area of the filtering carrier is higher than in the known self-cleaning filters and the self-cleaning properties will be improved by this increased weight of auxiliary filtering material per unit area. Further, the loose auxiliary material is compressed more tightly by the said increased operating pressure whereby air enclosures are effectively removed from the filter cake and the specific weight of the deposit is increased as compared with the specific weight of the filter cake of the known filters operating at lower pressures. This fact further improves the self-cleaning properties of the filtering-mass carrier. Due to the higher flow intensity at the filter surfaces a relatively small filtering vessel may be used wherein the flow may be rather intensive so that the auxiliary filtering material and the contaminations are deposited in uniform distribution over the effective filtering surfaces, this being a further aid for proper self-cleaning of the filters.

It is another object of this invention to improve self-cleaning of the filtering-mass carrier by gradually depositing the auxiliary filtering material together with the contaminations so as to form a deposit consisting of a substantially uniform mixture of auxiliary filtering material and contaminations, this mixture dropping readily off the filtering-mass carrier, particularly when compressed to a tight mass by application of increased pressure as stated above.

Figure 2:
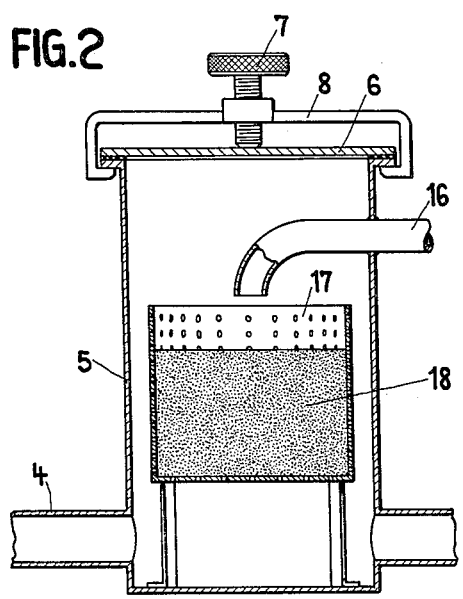
Figure 3:
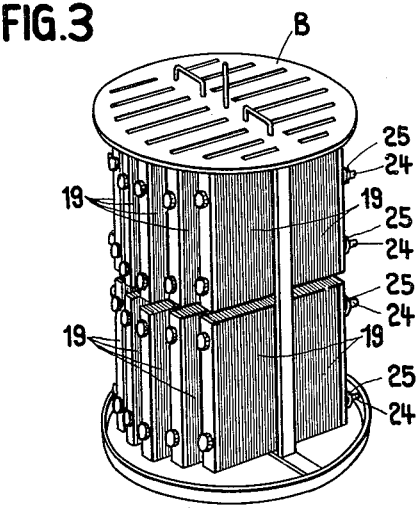
Figure 4:
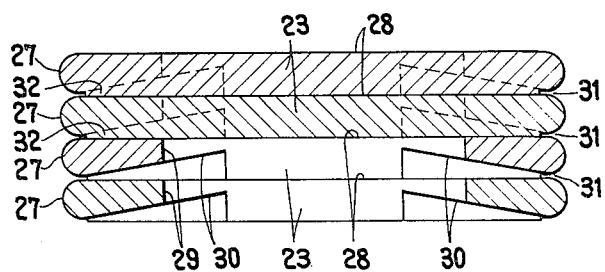

Further objects and features of the invention will be apparent from the following description and from the attached drawings, wherein:

FIG. 1 is a schematical illustration of a dry cleaning plant using a filtering system according to this invention, FIG. 2 is a sectional view of an apparatus for gradual addition of the auxiliary filtering material during filter operation, FIG. 3 is a perspective view of an assembly of filtering units adapted to be inserted into the filtering vessel of the filtering plant, FIGS. 4 and 5 are illustrations of flat elements of the filtering units on different enlarged scales, in section and in elevation respectively, FIG. 6 is a longitudinal section of two filtering-mass carriers, and the collecting canals connected thereto, FIG. 7 is a cross section of filtering mass carriers and collecting canals connected thereto, FIG. 8 is a sectional view of another embodiment of the said flat elements assembled to a filtering-mass carrier and further illustrates the composition of the filtering-mass at the end of the filtering process.

Figure 9:
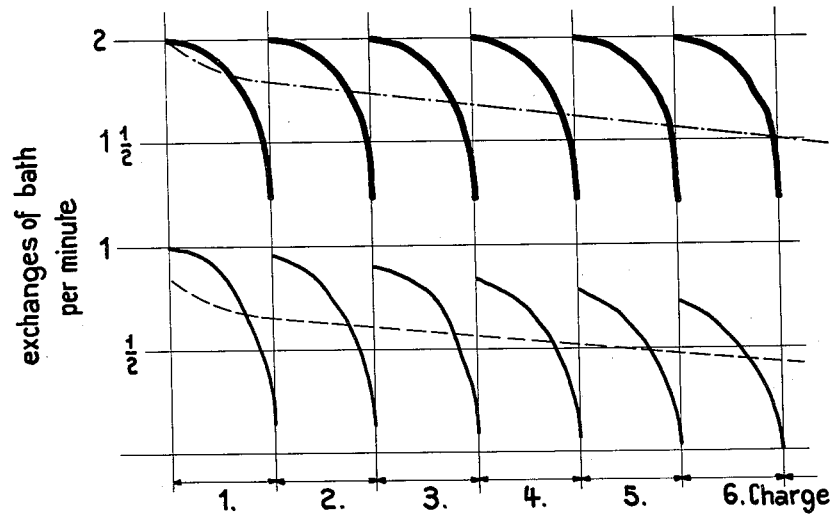
Figure 10:
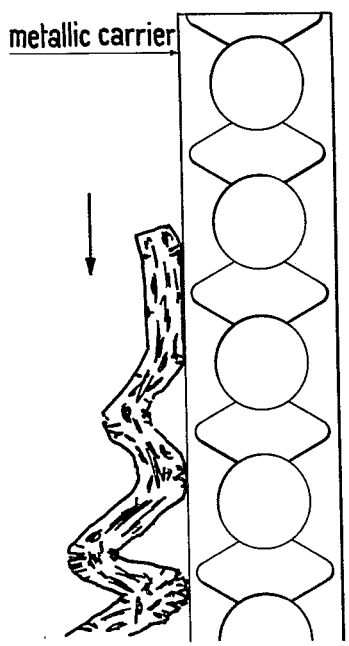
Figure 11:
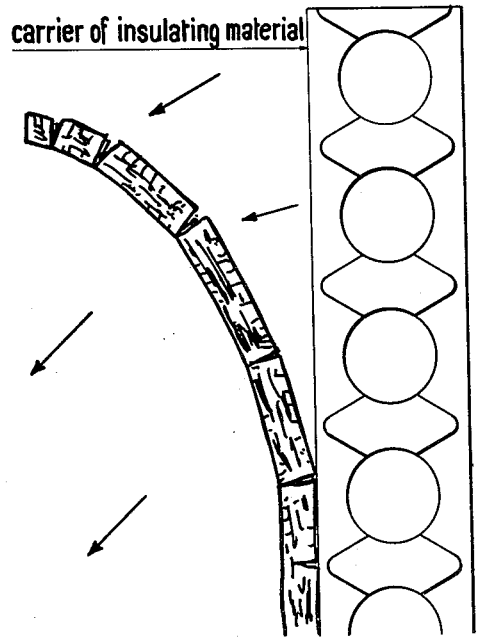

FIG. 9 diagrammatically illustrates the operating characteristics of the filter according to this invention and of known filters, and FIGS. 10 and 11 are an illustration of the cleaning properties of the filter according to this invention and of known filters.

The dry cleaning plant shown in FIG. 1 is of well known general construction and has a reservoir 1 for the cleaning fluid, from where the fluid may be admitted to a cleaning drum 2 by means of a valve 3. The outlet pipe 4 of the cleaning drum 2 communicates with a receptacle 5 of substantially cylindrical shape and closed by means of a cover 6. The cover 6 is maintained in position by means of a screw 7 and a bow 8 (FIG. 2). The receptacle 5 further communicates with the suction pipe of a pump 9 driven by a motor 10. The pressure pipe of the pump is connected to a three-way valve 11 by which the fluid may be directed either back to the reservoir 1 or through a sight glass 12 to the filter vessel 13. At its lower conical end the filtering vessel has a valve 14 for removing the sludge collecting at the bottom of the filtering vessel.

A vent 15 is connected to the top portion of the filtering vessel. Such vents are usual for preventing accumulation of air or other gases on top of the fluid to be filtered. In the filtering system shown in FIG. 1 the outlet of the vent 15 is connected to the receptacle 5 by means of a return pipe 16, the outlet opening of this return pipe 16 being directed into a container 17 inserted in the receptacle 5 and supported at the bottom of this receptacle by means of legs. The container 17 has its bottom and side walls perforated so that a quantity of pulverous auxiliary filtering material 18 filled into it may gradually be washed out of the container by a fluid jet from the return pipe 16.

A number of filtering-mass carrying units 19 mounted in a frame shown in FIG. 3 and connected to collecting canals as shown in FIGS. 6 and 7 are removably inserted into the filtering vessel 13. This frame has a baffle plate B preventing direct impact of the solvent entering the filtering vessel against the units 19. The common outlet piece 20 of the collecting canals fits with its conical surface into a conical recess of a return conduit 21 through which the filtered fluid is fed back to the cleaning drum 2. A further sight glass 22 is inserted into the return conduit 21.

As shown in FIGS. 4 to 7 each filtering-mass carrying unit is made of a number of substantially flat elements 23 piled upon each other and clamped together by means of bolts 24 and nuts 25 passing through covering openings of the flat elements 23 and of collecting canals 26 inserted between separate filtering units. As shown in FIGS. 4 and 5 the flat elements 23 have rounded edge surface portions 27 at opposite edges and one flat side surface portion 28 (the upper one in FIG. 4). Each element 23 has a number of uniformly distributed openings 29. The other side surface of the elements shown in FIG. 5 and at the bottom in FIG. 4 has inwardly tapering or inclined surface portions 30 extending from the narrowest place of the slits formed between the inner ends of the rounded edge surface portions 27 of the elements. Therefore, slit-shaped flow passages 31 are formed between adjacent elements at the said narrowest places, such slit-like passages having a constant width and extending over the full height of the filtering-mass carrying units as shown in FIG. 6. As shown in FIGS. 4 and 5, flat spacing elevations 32 are provided between adjacent openings 29, such elevations contacting the flat side surface 28 of the adjacent element thereby determining the distance of such elements and especially the width of the slit-like passages 31. As may be seen in FIG. 4 the outer ends of the elevations 32 are inside the said narrowest places of the slit-like passages 31 and therefore, the auxiliary filtering material deposited on the filtering-mass carrier will never be supported by such elevations 32.

In one preferred embodiment of this invention the strip-like flat elements 23 have a total length in the order of 18 cm., a width of 20 mm. and a total thickness of 1.65 mm. The width of the edge surface portions 27 is 1.5 mm. and the width of the narrowest places of the slits 31 is of 0.15 mm. FIG. 8 shows a section of a modified filtering-mass carrier the elements of which are similar to those shown in FIGS. 4 and 5, but the edge surface portions are substantially flat. These elements have a total thickness of 1.7 mm. the slit formed between adjacent elements having a width of 0.19 mm. However, the width of the slits may be increased to up to 0.25 mm. It may be seen that the width of the slit-like passage is in the order of $\frac{1}{10}$ of the total thickness of the elements and therefore, the total effective flow opening of the filter mass carrier is in the order of 10% of the total carrying surfaces. This is at least three times more than is possible with the well known self-cleaning filters disclosed in the above-mentioned British Patent No. 707,275 and about ten times more than is possible with known filters the carrying surface of which is constituted by wire screens. Due to this relatively high percentage of slit openings whereon the auxiliary filtering material deposited on the carrying surfaces will not have any support, the self-cleaning effect is substantially improved. As stated above, an auxiliary filtering material known under the trade name "Hyflo 535" manufactured by Johns-Manville is preferably used, this material comprising particles of which 2% are within a size of 0.01 to 0.2 mm. whereas the rest of 98% of the particles has a size below 0.01 mm.

In operation of the filtering plant shown in FIGS. 1 and 2 and of the filtering units shown in FIGS. 3 to 7 the clothes to be washed are loaded into the drum or wheel 2 and the required quantity 18 of Hyflo is inserted into the container 17 whereupon the receptacle 5 is closed again. Cleaning solvent is now admitted to the washing drum from the reservoir 1 without first starting up the drum, and the pump 9 is started up so that a flow of cleaning solvent is set up from the drum 2 through receptacle 5, pump 9, valve 11, the filtering vessel 13, the slits 31 of the filtering mass carriers, the collecting canals of the filtering-mass carriers and the return pipe 21 back to the drum 2. Since, as mentioned above, the drum is not jet rotated, practically no contaminations are solved from the clothes. As soon as the pressure is set up in the filter, the air which may be carried along with the first quantities of cleaning solution will accumulate at the upper end of the filtering vessel, from where it escapes through the always open vent 15 back to the receptacle 5 from where it may escape, or is fed back into the filtering circuit wherein it will eventually return in fine dispersion or suspension through the filter and back to the washing drum 2. When an air accumulation has escaped from the filtering vessel through the vent 15 and return pipe 16, cleaning solvent will now return through the vent 15 and pipe 16 to the receptacle 5 and will gradually wash the filtering powder 18 out of the container 17 into the circuit of the cleaning solvent. Since the flow intensity is very high due to the above-mentioned high percentage of effective slit opening of the filters the filtering material added to the solvent is rapidly deposited on the carrying surfaces of the filter thereby forming first a layer of practically pure filtering material having a thickness in the order of 2 mm., this initial layer being shown at 33 in FIG. 8. Completion of this layer is indicated by the sight glass 22, wherein the solvent is absolutely clean when layer 33 is completed. The drum 2 is now started up so that the cleaning operation is set up and contaminations are carried with the flow of solution into the filtering vessel where they are deposited on the already formed initial filtering-mass layer 33. At the same time further filtering material is gradually washed out of the container 17 and is added to the flow of cleaning solvent and deposited on the filtering surfaces. Therefore, an outer layer 34 is formed on the initial layer 33, and layer 34 being a mixture of contaminations 35 and of filtering material 18. This gradual addition of filtering material 18 prevents complete clogging of the filters by a tight layer of contaminations. On the other hand a relatively compact layer 34 is formed by the mixture of contaminations and of filtering material, this layer dropping readily off the filtering surfaces when the pump pressure is ceased. Since the filtering carriers are able to stand very high pressures the pump 9 may be dimensioned to deliver the solvent at a relatively high pressure at which the filtering material deposited on the carrying surfaces of the filter is not unduly compressed and will not prevent a sufficient flow of a solvent through the filter. However, by this relatively high maximum pressure which is nearly twice as high as the pressures admissible with the well known self-cleaning filters the layer of filtering material and contaminations is tightly compressed and air enclosures which may be deposited in this layer are effectively pressed out so that a compact layer of relatively high specific weight is obtained which will readily drop off the filtering-mass carriers when the pump is shut down at the end of the cleaning process.

It is well known that a certain minimum amount of auxiliary filtering material has to be used for binding a predetermined amount of contaminations. Therefore, since the sum of the auxiliary material and of the contaminations is equal for any type of filtering-mass carrier, the layer formed on the carrying surfaces by the auxiliary filtering material and the contaminations will be thicker and heavier when the total filtering surface is relatively small. As stated above, the percentage of effective filter opening is three times higher with my filter as it was with the best known filters and therefore, the total surface of my filter may be three times smaller and the layer of filtering material and contaminations deposited thereon three times thicker than with the best known filters. In practice a quantity of 320 grams of "Hyflo 535" may be used as an example per square meter of total filtering surface of my filter, this resulting in a total thickness of layers 33 and 34 of 4 to 5 mm. It is evident that such a relatively thick, heavy and compact layer will easier drop off the filtering-mass carriers than it would be the case with the known filters wherein the same quantity of auxiliary filtering material is distributed on a filtering surface three times larger.

It is a very important feature of my filtering-mass carrier that the narrowest places 31 of the slit-like flow openings are of absolutely equal width and that the flow passages are opening inwardly from such places 31. Therefore the filtering mass can only be deposited outside such narrowest passages where it is exclusively supported on smooth absolutely vertical surface portions which are impermeable to the fluid and from which the filtering material will readily drop off when no longer pressed against such surfaces by the operating pressure. Such carrying surfaces 27 may preferably be smoothed by working in a direction parallel to the longitudinal axis of the elements so that working traces will run in the vertical direction when the filtering elements are positioned vertically in operating condition as seen in FIGS. 3 and 6. Therefore eventual working traces or inequalities running in the vertical direction will not hinder dropping off of the filtering-mass from the filtering-mass carriers. Therefore the cleaning property of my filtering-mass carriers is an absolute one as schematically shown in FIG. 9, wherein the flow characteristics are illustrated for several successive filtering operations or charges as indicated on the ordinate of the diagram by the 1. to 6. "charge." As shown in heavy full lines my filter has the same maximum flow at the beginning of each charge of filtering process, this flow being sufficient for exchanging twice per minute the full solution contents of the cleaning drum. As shown in weak full lines a filter according to the British Patent 707,275 of the same price will initially have half the flow which will sink to practically zero towards the end of the first charge. This is due to the relatively low allowable operating pressure of the pump, this pressure being limited to about 1.8 kg./cm.$^2$. Due to the increasing contamination or uncomplete cleaning effect of this known filter the maximum flow will decrease for each successive charge or filter operation and therefore the properties of the cleaning plant or of the filtering plant used for another purpose will be variable for successive charges. The same applies for so-called multi-charge filters wherein several charges are filtered with the same filtering material and whereby additional filtering material is deposited during every charge. It is evident that in such filters the flow decreases during every successive charge. The dash-dotted line of FIG. 9 shows the flow characteristics for an over-dimensioned multi-charge filter having an initial flow corresponding to the flow of my filter. The dashed line in FIG. 9 shows the flow characteristics of a multi-charge filter as normally used. It is well seen from FIG. 9 that there does not exist any filter allowing equal maximum flow during every successive charge, except my filter wherein this result is obtained due to the high allowable operating pressure and due to the absolutely complete self-cleaning of the filter.

At the end of each charge the drum 2 is stopped and the solution is pumped back into the reservoir 1 by reversal of valve 11. The filtering-mass dropping off the filtering-mass carriers 19 is accumulated at the bottom of the filtering vessel 13 and may be drained off periodically through the valve 14.

As mentioned above, the material of the filtering elements 23 is of great importance for the self-cleaning properties of the filtering-mass carriers built up from such elements. It was found that such elements should be made of an electrically insulating material and for practical reasons such elements are usually made of a plastic material resistant to the fluid to be filtered or taste-free when used for filtering drinks. A further requirement may be that such elements withstand relatively high temperatures, for instance boiling temperature when used for filtering drinks which have been sterilized previously. Many kinds of plastic materials are available meeting with all these requirements. For the above described dry-cleaning plant phenol-plastics known under the trade names "Bakelite" or "Alberit" may be used. Other suitable electrically insulating materials may as well be used. When the auxiliary filtering material, for instance the one known under the trade name "Hyflo" and consisting of electrically insulating particles, is deposited on the electrically insulating filtering mass carrier, electrostatic charges are induced in the auxiliary filtering-mass and in the carrier therefor by the friction of the cleaning solvent, such charges being of equal polarity. Therefore, the filtering-mass is repelled from its carrier and, as was found by experiments, the filtering-mass is repelled as a whole from its carrier as shown in FIG. 11 when the filtering pressure is removed, an excellent self-cleaning action being thereby obtained. On the contrary, the filtering-mass deposited on an otherwise similar but metallic carrier is not repelled but rather adheres to this carrier as shown in FIG. 10, whereby self-cleaning of the filter is rendered much more difficult. I am aware that other filters exist having filter elements of electrically insulating material, but such filters have never been used as self-cleaning filter material carriers and therefore could not possibly suggest the advantages of the use of an electrically insulating carrier for a self-cleaning filtering-mass carrier.

However, I have further found that the use of a filtering mass carrier of electrically insulating material has particular advantages when used with the specific form of filtering elements described above. The intensity of the electrostatic charges mentioned above depends on the flow intensity of the fluid to be filtered. Due to the relatively high flow capacity of my filter, which is a result of the high flow-opening to total-filtering-surface ratio and of the high admissible operating pressure, the electrostatic charges are high and may be made use of, when the fluid to be filtered is also practically an electric insulator. This is the case for the solvents normally used in dry cleaning plants. In my filter a flow is possible of 1200 liters per square decimeter of effective filter opening and per hour this resulting in a flow speed in the order of 3 cm./second through the filter openings. Further, the particles of the filtering-mass are tightly pressed against the carrying surfaces by the relatively high operating pressure of 3 to 3.5 kg./cm.$^2$ and it is well known that the electrostatic voltages will increase when particles electrostatically charged in close proximity are separated subsequently. Therefore, when using filtering-mass carriers of electrically insulating material the increased pressure will not result in a tighter contact and adherence between the filtering mass and its carrier but in an improved self-cleaning property. It is a further important feature of my filtering plant that a layer of pure filtering material is first deposited on the carrier of electrically insulating material whereby discharging effects by electrically conducting contaminations are avoided in the inner layer 34 of the deposit so that the said repelling effect cannot be reduced. Different of the usual cleaning solvents such as naphtha, carbontetrachloride, trichloroethylene and perchloroethylene may be used and the self-cleaning effect of the filter is not substantially affected by moisture contents of such solvents up to 10%.

It is possible that by faulty operation of the plant the filter is completely clogged and will no longer clean automatically. It is a further advantage of my filter which is pressure resistant in both flow directions, that under these circumstances it may be cleaned by a sharp pressure wave produced at the outlet pipe 21 of the filter by means not shown in the drawing. This pressure wave is transmitted through the collecting canals of the filter to every portion of the slit-like passages where the contaminations are pressed out of such passages. Therefore, the filter may be cleaned not by proper reverse flow as is usual for cleaning filters, but by a backward pressure shock only without substantial backward flow requiring reversal of valves to set up a proper reverse flow. It should be noted that for normal operation and normal shut-down periods of the plant the filtering units 19 are always completely immersed in the solvent due to the siphon or trap S (FIG. 1) of the outlet conduit 21.

It is a further advantage of my filter that due to its high mechanical strength a powerful pump may be used producing a very intensive flow particularly at the beginning of the formation of the deposit on the filtering-mass carriers. Due to this fact only coarse particles are first deposited on the filtering surfaces whereas fine particles are spilled through the filter. Consequently an innermost layer of coarse particles is formed on the carrying surfaces as may be seen from FIG. 9, and it is evident that such coarse particles have not as much points contacting the carrying surfaces as would be present when very fine particles are in contact with such surfaces. Therefore rapid deposition of the auxiliary filtering material within a time in the order of 10 seconds by means of an intensive flow of fluid to be filtered substantially improves the self-cleaning properties of the filter.

What I claim is:

1. A filtering mass carrier whereon a mass of auxiliary filtering material is deposited and maintained in position thereon by the normal pressure of the fluid when in use as a filter, comprising a plurality of strip-like generally flat elements moulded of synthetic resin, a central portion of said elements having flat opposite side surfaces, profiled edge portions at either side of said central portion, a place of maximum thickness of said profiled edge portions at a distance outside the said central portion, the said maximum thickness being smaller than the thickness of said central portion and the thickness of the profiled edge portions decreasing inside the said place of maximum thickness, the cross section of the said profiled edge portions being equal throughout the full length of the element at least outside the said place of maximum thickness, the elements positioned with their side surfaces adjacent and with their axes extending in generally vertical direction, slit-like fluid passages extending over the full length of the elements being formed between the said edge profiles of adjacent elements, such passages having a minimum width between said places of maximum width of the edge profiles and widening from the said places of minimum width inwardly, and carrying surfaces for the auxiliary filtering material being formed by the edge profile portions outside their said places of maximum thickness, such carrying surfaces comprising exclusively surface portions parallel to the said generally vertical direction so that no support is offered to the said auxiliary filtering material on said carrying surfaces and the filtering material will fall off the carrying surfaces when the filtering-fluid pressure is ceased.

2. A filtering mass carrier whereon a layer of auxiliary filtering material is deposited and maintained in position thereon by the normal pressure of the fluid when in use as a filter, comprising a plurality of strip-like generally flat elements moulded of synthetic resin, a central portion of said elements having opposite side surfaces, profiled edge portions at either side of said central portion, a place of maximum thickness of said profiled edge portions at a distance outside the said central portion and the thickness of the profiled edge portions decreasing inside the said place of maximum thickness, the cross section of the said profiled edge portions being substantially equal throughout the full length of the element at least outside the said place of maximum thickness, the elements positioned with their side surfaces adjacent and with their axes extending in generally vertical direction, slit-like fluid passages extending over the full length of the elements being formed between the said edge profiles of adjacent elements, such passages having a minimum width between said places of maximum width of the edge profiles and widening from the said places of minimum width inwardly, and carrying surfaces for the auxiliary filtering material being formed by the edge profile portions outside their said places of maximum thickness, such carrying surfaces comprising exclusively surface portions substantially parallel to the said generally vertical direction so that no support is offered to the said auxiliary filtering material on said carrying surfaces and the filtering material will fall off the carrying surfaces when the filtering-fluid pressure is ceased.

References Cited in the file of this patent

UNITED STATES PATENTS

| | | |
|---|---|---|
| 1,557,585 | Hele-Shaw | Oct. 20, 1925 |
| 1,744,510 | Hele-Shaw | Jan. 21, 1930 |
| 2,286,432 | Monsarrat | June 16, 1942 |
| 2,592,104 | Arakelian | Apr. 8, 1952 |
| 2,601,521 | Heftler | June 24, 1952 |
| 2,828,862 | Johnson | Apr. 1, 1958 |

FOREIGN PATENTS

| | | |
|---|---|---|
| 72,795 | Sweden | Oct. 6, 1931 |
| 707,275 | Great Britain | Apr. 14, 1954 |
| 736,968 | Germany | July 2, 1943 |